A. HOSSFELD.
STEAM ENGINE VALVE GEAR.
APPLICATION FILED AUG. 26, 1907.
909,302.
Patented Jan. 12, 1909.
2 SHEETS—SHEET 1.
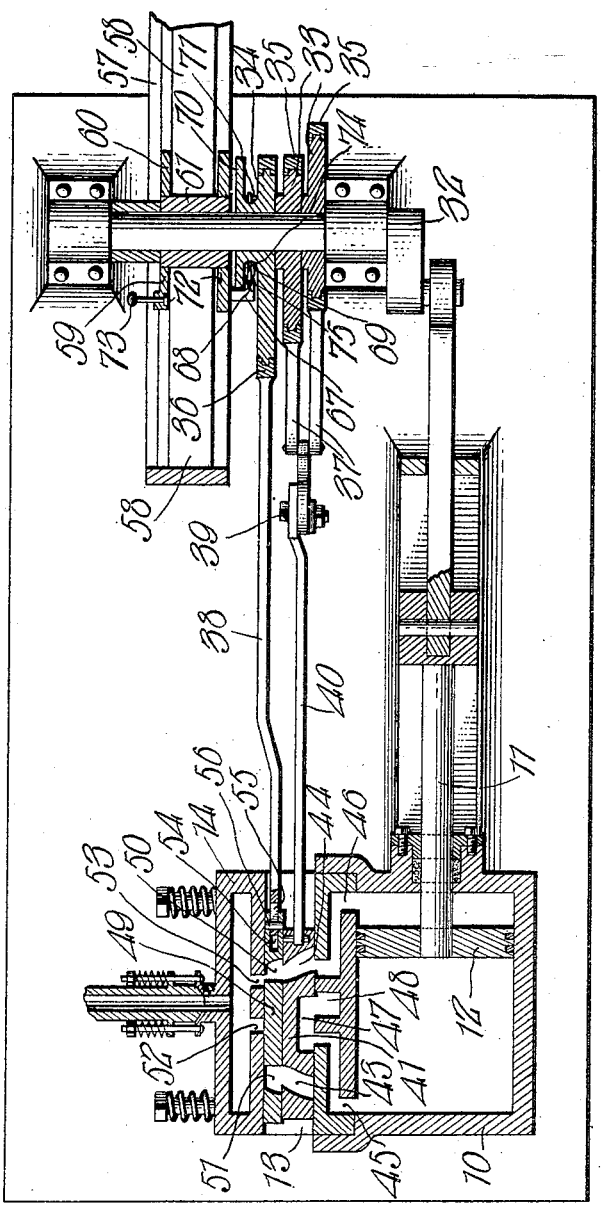
*Fig. 1.*
Inventor
Albert Hossfeld,
Witnesses
By
Attorneys.

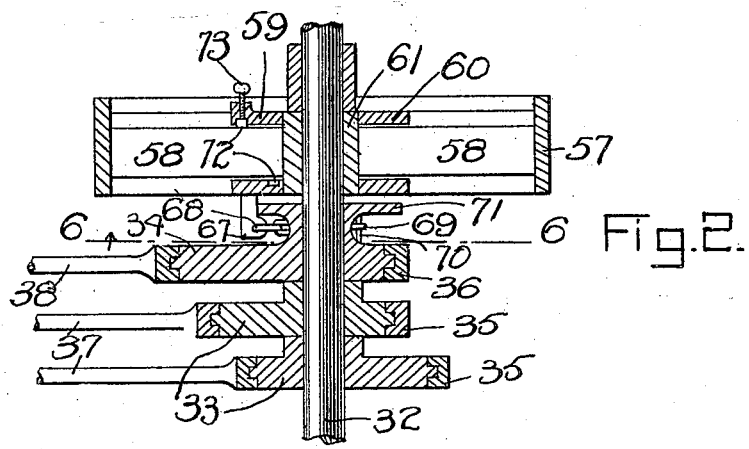
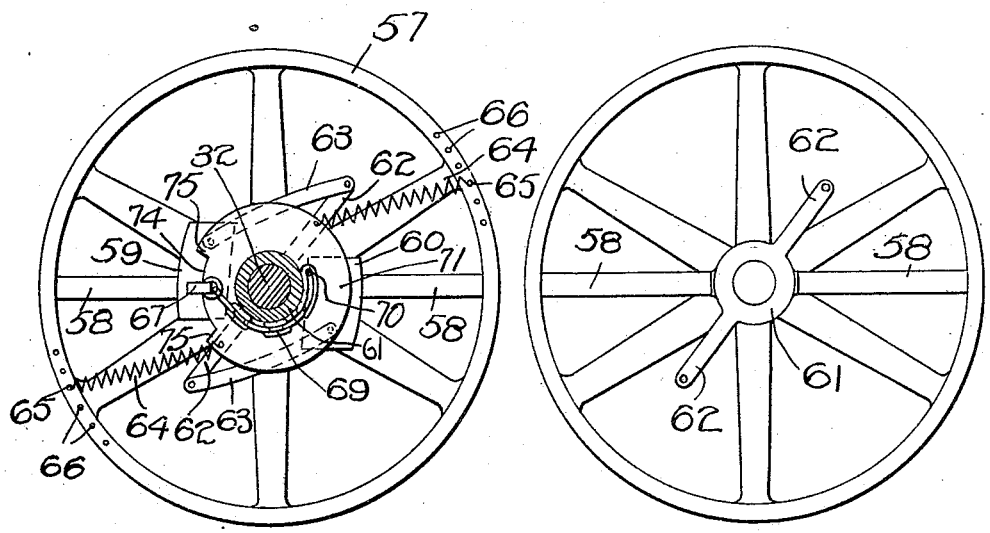

UNITED STATES PATENT OFFICE.

ALBERT HOSSFELD, OF LEWISTON, MINNESOTA.

STEAM-ENGINE VALVE-GEAR.

No. 909,302.  Specification of Letters Patent.  Patented Jan. 12, 1909.

Application filed August 26, 1907. Serial No. 390,198.

*To all whom it may concern:*

Be it known that I, ALBERT HOSSFELD, a citizen of the United States, residing at Lewiston, in the county of Winona, State of Minnesota, have invented certain new and useful Improvements in Steam - Engine Valve-Gears; and I do hereby declare the following to be a full, clear, and exact description of the invention, such as will enable others skilled in the art to which it appertains to make and use the same.

The invention relates to new and useful improvements in shifting eccentrics and more particularly to that class adapted for use with steam engines.

The invention aims to provide a novel construction, combination and arrangement of parts, the details of which will appear in the course of the following description, in which reference is had to the accompanying drawings, forming a part of this specification, like characters of reference designating similar parts, throughout the several views, wherein:

Figure 1 is a top plan view of the engine partly broken away and constructed in accordance with the present invention. Fig. 2 is a section through the elements mounted on the engine shaft in the direction of such shaft, the shaft being shown in elevation. Fig. 3 is a section on the line 6—6 of Fig. 2, looking in the direction of the arrow. Fig. 4 is a detailed view of a fly-wheel comprehended in the invention, together with an equalizing element mounted on the engine shaft concentrically of the fly-wheel to be hereinafter specifically referred to.

In the accompanying drawings, the numeral 10 designates the engine cylinder, the numeral 11, the piston rod, the numeral 12 the piston head, the numeral 13 a valve chamber, and the numeral 14, a steam chest.

The piston rod 11 drives a crank shaft 32 upon which are provided eccentrics 33 and 34. Eccentric straps 35 and 36 are engaged about these respective eccentrics, the straps 35 and 36 having connection with respective eccentric rods 37 and 38. The rods 37 have connection with any conventional reversing mechanism 39, the latter operating a valve stem 40 connected at its end to a slide valve 41 in the valve chamber 13 formed with ports 43 and 44 which are designed to be brought alternately into registry with respective steam ports 45 and 46 of the cylinder 10. The valve 41 has in its under face a recess 47 which is likewise designed to be brought into alternate registry with the steam ports 45 and 46 and in such action to afford communication between said respective steam ports and an exhaust port 48. The rod 38 forms the stem of a cut-off valve 49 adjacent the valve 41 and constructed with openings 50 and 51 which are designed to register with the respective openings 43 and 44 and likewise to alternately register with respective openings 52 and 53. The valve 49 is constructed at one end thereof with a recess 54 in which the end of the rod 38 is slidably received.

The rod 38 is formed at its end with a slot 55 which surrounds a pin 56 arranged in the recess 54, the slot 55 and pin 56 constituting a lost motion joint.

Keyed upon the shaft 32 is a fly-wheel 57 constructed with inwardly projecting arms 58 terminating short of its hub which arms slidably support weights 59 and 60 suitably mounted thereupon.

Surrounding the shaft 32 and disposed concentrically of the wheel 57 is a sleeve 61 formed at diametrically opposite points with radially extending arms 62, the latter being connected at their ends by links 63 with the weights 59 and 60. The arms 62 have connected thereto the inner ends of retractile coil springs 64, the latter having their outer ends formed with hooks 65 for engagement with selected ones of a plurality of pins 66 mounted in series at opposite sides of the rim of the wheel 57. The pins 66 are provided to permit the tension of the springs 64 being regulated.

Projecting from one side of the weight 59 is a lug 67 having an aperture 68 in which is engaged one end of a chain 69, the other end of said chain engaging a transverse pin 70 carried by a pulley formed integral with the eccentric 34 and the hub flange 71.

The sleeve 61 and arms 62 constitute the equalizing element above referred to and it will be understood that in such function the slightest movement of either of the weights 59 and 60 under centrifugal force will be imparted to the other weight and that by reason of these connections the weights effectually counterbalance one another.

The weight 59 is provided with bearing sections 72 to facilitate its movement along the arm 58, one of such sections being adjusted by means of a thumb screw 73 threaded laterally through said weight. The flange 71 is constructed at one side thereof with a recess 74 affording confronting shoulders 75 in which the lug 67 is designed to engage as a dog in a manner and for a purpose to be later explained.

In operation, when the engine attains a predetermined speed the weights 59 and 60 will move outward on the guides 58 under centrifugal force against the tension of the springs 64 and in such action the chain 69 is drawn taut, turning the eccentric 34 with relation to the eccentric 33 so as to regulate the position of the valve 49 during the registry of the ports 45 and 43, and 46 and 44, with relation to the ports 52 and 53, such positioning resulting in uncovering or covering said ports to a greater or less degree during registry of the first named ports in accordance with the operation of the engine at high or low speed. Assuming that the engine is reversed, the consequent gradual stoppage of action will permit of the springs 64 moving the weights 59 and 60 inwardly, which will cause the chain 69 to become slack and will permit of movement of the eccentric 34 with relation to the said weights 59 and 60 until the lug 67 on the weight 59 becomes adjacent to and engaged in the recess 74 as shown in Fig. 3, at which time, said eccentric gives the cut-off valve a late cut-off in either running direction of the engine. The eccentric 34 is held in this position by reason of the engagement of the lug 67 in the recess 74 when the engine is first reversed and the relation of the eccentric 34 to the eccentric 33, is not reversed until the engine attains its normal speed in a reverse direction at which time, the weights will move outwardly in the manner above set forth and disengage the said lug from the said recess which at once causes the eccentric 34 to come to a stop while the weight 59, carrying one end of the chain 69 unwinds said chain from the hub or pulley of said eccentric 34 and again winds it thereupon in a reverse direction. Hence the relation of the eccentric 34 to the eccentric 33 is reversed and the eccentric 34 is rotated on the shaft in an opposite direction. It will thus be seen that the cut-off valve 49 is adjusted automatically to either running direction of the engine and that said valve is not reversed until the engine attains a certain speed in the reverse direction.

The provision of the lost motion joint between the rod 38 and the valve 49 causes this rod to lose one-third of the throw of the eccentric. For this reason an eccentric with a longer throw than usual may be employed, in order that said eccentric may move from its dead point to a position where it will move the connecting rod at its highest speed before the latter begins to move the cut-off valve and it follows that when the rod 38 acts on the cut-off valve, it moves it quickly, thus cutting off the supply of steam from the cylinder quickly and permitting the admitted steam to expand.

It will be understood that the cut-off steam is automatically adjusted to any required point of the rotation of the eccentric 34 with relation to the engine shaft, in the direction in which the shaft is rotating, for an earlier cut-off in a direction reverse to that in which the shaft is rotating for a later cut-off.

The provision of the adjustable bearings 72 causes the weight to frictionally grip the guide 58 when a pull is exerted at the point of connection of the weight 59 with the chain 69 in order that any amount of power may be taken from the eccentric 34 without having any effect on the weights 59 and 60.

The speed of the engine is changed by regulating the tension of the springs 64, such regulating being made by engaging the hooked ends 65 of said springs with the desired stud 66.

The invention may be applied to any common type of slide valve engine, is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit of the invention as defined in the appended claims.

What is claimed is—

1. In a shifting eccentric for steam engines, a fly wheel having oppositely disposed inwardly extending arms, weights slidable upon said arms, a lug projecting outwardly from one of said weights and having an eye, a shifting eccentric, a chain having one end fixed to said eccentric and the opposite end connected to the eye of the lug, an equalizer having extension arms, links connected to said arms and the weights, and tension means connected to said arms and adjustably connected to the fly wheel.

2. In a steam engine, the combination with a cut off valve, of a fly wheel having oppositely disposed inwardly extending arms, weights slidable upon said arms, a lug projecting outwardly from one of said weights and having an eye, a shifting eccentric having connections with the cut off valve, a chain having one end fixed to said eccentric and the opposite end connected to the eye of the lug, an equalizer having extension arms, links connected to said arms and the weights, and tension means connected to said arms and adjustably connected to the fly wheel.

In testimony whereof I affix my signature in presence of two witnesses.

ALBERT HOSSFELD.

Witnesses:
JACOB F. MUSSLOCH, Jr.,
HENRY FISCHER.